United States Patent Office 3,339,975
Patented Sept. 5, 1967

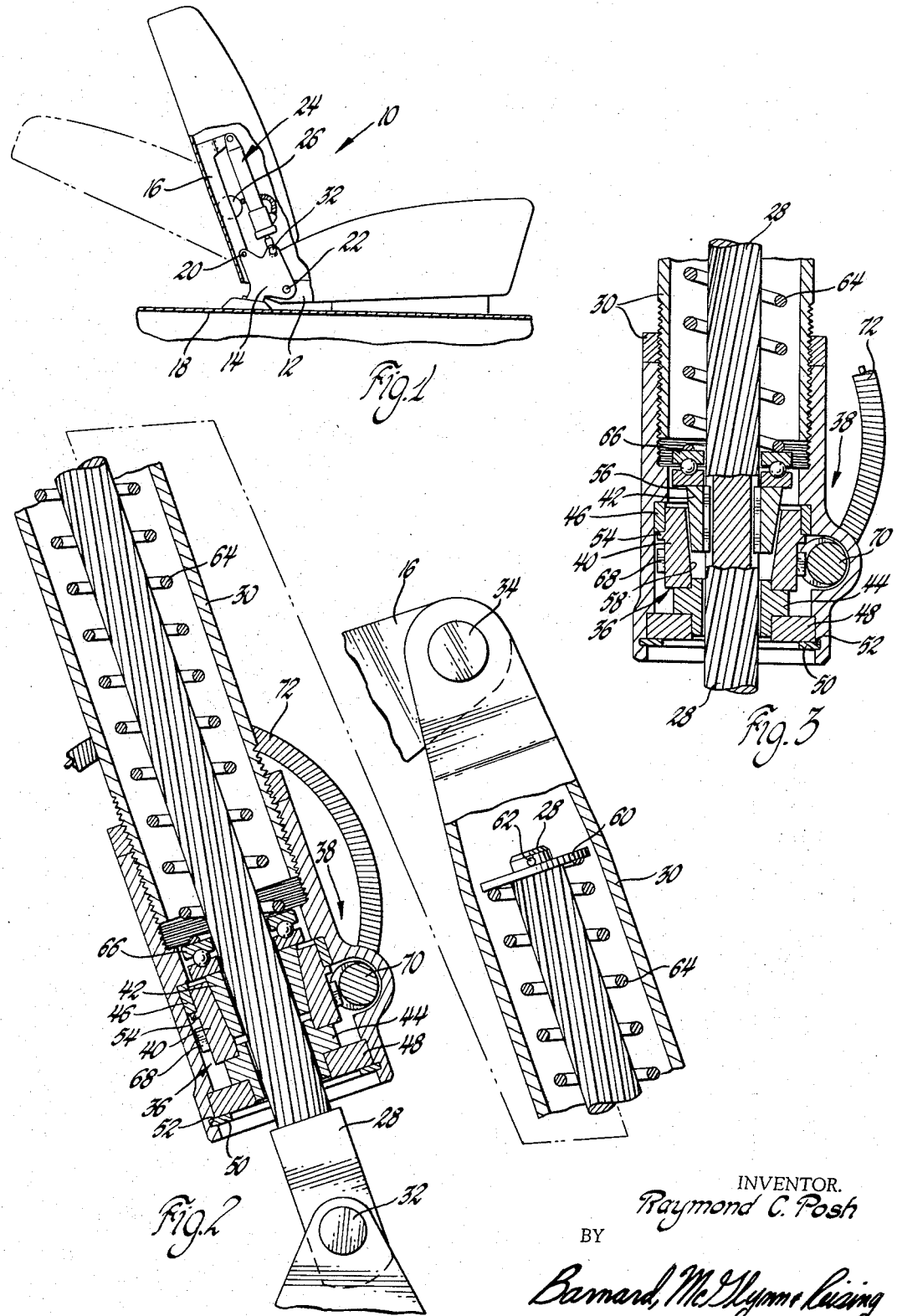

3,339,975
RECLINING SEAT ASSEMBLY
Raymond C. Posh, Livonia, Mich., assignor, by mesne assignments, to Lear Siegler, Inc., Santa Monica, Calif., a corporation of Delaware
Filed Apr. 5, 1966, Ser. No. 540,357
23 Claims. (Cl. 297—361)

ABSTRACT OF THE DISCLOSURE

A reclining seat assembly including a seat frame and a seat back frame pivotally connected to the seat frame for pivotal movement between an upright position and various reclined positions and a positioning mechanism for controlling the pivotal movement of the seat back frame relative to the seat frame. The positioning mechanism includes a housing and a threaded rod disposed in the housing. A first element is rotatably supported by the housing and has gear teeth thereon for engaging a worm which is rotated by a power drive means. A second element is in threaded engagement with the rod and has a surface for coacting with the first element so that upon rotation of the first element by the power drive means, the second element rotates and moves the rod relative to the housing. Upon a force being applied to the rod, the first and second members separate so that the second member can rotate on the rod while the first member, which is in positive engagement with the drive means, remains stationary, thus allowing the seat back frame to be pivoted from a reclined position toward the upright seat forming position.

There has been an ever increasing demand and utilization of power actuated positioning mechanisms for controlling the pivotal movement of the seat back frame relative to the seat frame. Such power actuated mechanisms typically utilize a small electric motor which is actuated by a switch to pivot the seat back frame relative to the seat frame. The prior art power actuated positioning mechanisms utilize components which are operatively interconnected so that the only manner in which the seat back frame can be pivoted relative to the seat frame is by actuation of the motor. It is often desirable, however, that the seat back frame be movable from a reclined position toward the upright position without the necessity of actuating the positioning mechanism, the control for which is normally disposed adjacent the seat frame.

Accordingly, it is an object and feature of this invention to provide a reclining seat assembly including a power actuated mechanism for controlling the pivotal movement of a seat back frame relative to a seat frame and which will allow the seat back frame to be pivoted toward the upright position without actuation thereof.

Another object and feature of this invention is to provide a reclining seat assembly including a positioning mechanism comprising two members which are movable in opposite directions relative to one another in response to the actuation of a drive means and are allowed to move relative to one another in one of the directions independently of the actuation of the drive means.

In general, these and other objects and features of this invention may be attained in a preferred embodiment of the instant invention which includes a seat frame, a seat back frame, and means pivotally connecting the seat back frame to the seat frame for allowing the seat back frame to pivot relative to the seat frame between an upright position and various reclined positions. A positioning means interconnects the seat frame and the seat back frame for controlling the pivotal movement of the seat back frame and includes a housing and a threaded rod which are adapted for movement relative to one another with the housing being pivotally connected to the seat back frame and the rod being operatively and pivotally connected to the seat frame. A first element is rotatably supported by the housing and is in positive engagement with a drive means. A second element threadedly engages the rod and is normally in driven frictional engagement with the first element for rotation thereby. The second element may be moved out of frictional engagement with the first element for rotation independently of the first element so that the housing and rod may be moved relative to one another in a first direction independently of the actuation of the drive means. More specifically, the second element has a male conical surface which is urged into the frictional engagement with a female conical surface on the first element by a spring which reacts between the end of the rod disposed within the housing and the second element. Normally, therefore, the second element, which threadedly engages the rod, is in frictional driven engagement with the first element so that upon actuation of the drive means, the second element moves along the rod to affect relative movement between the rod and the housing, thereby to adjust the position of the seat back frame relative to the seat frame. When the seat back frame is in a reclined position, however, it may be manually pushed toward the upright position since the rod is moved into the housing to remove the second element from frictional engagement with the first element to allow the second element to rotate and move along the rod independently of rotation of the first element as the force is applied to the seat back frame urging it toward the upright position. When such a force is released, the second element again frictionally engages the first element to retain the seat back frame in the selected position and to adjust the position of the seat back frame by actuation of the drive means.

Other objects and attendant advantages of this invention will be readily appreciated as the same becomes better understood by reference to the following detailed description when considered in connection with the accompanying drawings wherein:

FIGURE 1 is a side elevational view partially broken away of the preferred embodiment of the instant invention;

FIGURE 2 is an enlarged fragmentary cross-sectional view of a preferred embodiment of the positioning mechanism of the instant invention; and FIGURE 3 is an enlarged fragmentary cross-sectional view similar to FIGURE 2 and showing the components in a moved position.

Referring now to the drawings, wherein like numerals indicate like or corresponding parts throughout the several views, a reclining seat assembly is generally shown at 10 in FIGURE 1. The seat assembly 10 includes a seat frame 12, an intermediate frame 14 and a seat back frame 16. The assembly is supported on a suitable structure 18, such as the floor in an automobile, bus, or the like. The intermediate frame 14 comprises a means connecting the seat back frame 16 to the seat frame 12 for allowing the seat back frame 16 to pivot relative to the seat frame 12 between an upright position, which is shown in solid lines in FIGURE 1, and various reclined positions, one of which is shown in phantom in FIGURE 1. The seat back frame 16 is pivotally connected at 20 to the intermediate frame 14 and the intermediate frame 14 is preferably pivoted at 22 to the seat frame 12. When the intermediate frame 14 is pivotally connected to the seat frame 12 as at 22, the seat back frame 16 may be moved to a forwardly folded rear entry position. In some embodiments, the intermediate frame 14 may be eliminated whereby the seat back frame 16 will be pivotally connected directly to the seat frame 12 instead of being pivotally connected to the seat frame 12 through the intermediate frame 14.

A power actuated positioning means, generally indicated at 24, controls the pivotal movement of the seat back frame 16 and includes the motor 26. The positioning means 24 includes a member, the threaded rod 28, which is adapted for movement relative to another member, the housing 30. The rod 28 is pivotally connected by the pin 32 to the intermediate frame 14; hence, the rod 28 is operatively and pivotally connected to the seat frame 12. The housing 30 is pivotally connected by the pin 34 to the seat back frame 16. The housing is illustrated as comprising two threadedly connected members, but, as will be apparent to those skilled in the art, the housing may be one unitary member.

There is also included a control means, generally shown at 36, which is in positive driven engagement with a drive means, generally shown at 38, is threadedly engaging the rod 28, and is rotatably supported by the housing 30 for selectively moving the rod 28 and housing 30 relative to one another in first and second opposite directions upon rotation thereof by the drive means 38 and allows relative movement between the rod 28 and the housing 30 in the first direction as the drive means remains stationary. More specifically, the control means 36 includes a first element 40 rotatably supported by the housing 30 and in positive driven engagement with the drive means 38, and a second element 42 threadedly engaging the rod 28 and normally in frictional driving engagement with the first element 40 for rotation thereby. Bearing means including bearings 44 and 46 rotatably support the element 40 in the housing 30. The bearing 44 is retained in the housing 30 by a spacer 48 and a clip 50 which is removably disposed in the annular recess 52. The element 40 has an annular shoulder 54 which rides against the bearing 46 and acts in conjunction with the engagement between the element 40 and the bearing 44 to prevent movement of the element 40 relative to the housing 30 in a direction parallel to the longitudinal axis of the rod 28. The element 42 includes a male conical surface 56 which is normally disposed in frictional driving engagement with the female conical surface 58 in the element 40, as illustrated in FIGURE 2. A retaining means comprising the washer 60, which is held in place by a pin 62, is disposed on the end of the rod 28 within the housing 30 and a biasing means comprising the spring 64 is disposed between the washer 60 and a bearing 66 for urging the element 42 into frictional driving engagement with the element 40. The element 40 includes gear teeth 68 disposed circumferentially about its periphery, and the drive means includes the worm gear 70 which is rotatably supported in the housing 30 and engages the gear teeth 68 for rotating the element 40. The worm gear 70 is rotated by the motor 26 through the motion transmitting element 72.

As illustrated in FIGURE 2, the male conical surface 56 of the element 42 is normally in frictional driven engagement with the female conical surface 58 of the element 40 so that upon actuation of the motor 26, the worm gear 70 is rotated to rotate the element 40, thus rotating the element 42 to effect relative movement between the rod 28 and the housing 30. Depending upon the direction of rotation of the motor and hence the element 40, the rod 28 will be moved into or out of the housing 30. Thus, by actuation of the motor 26, the seat back frame 16 may be pivoted relative to the seat frame 12 in either direction between an upright position and various reclined positions. The element 42, however, is movable from the frictional driving engagement with the element 40 so that it is free to rotate independently of the element 40 to allow relative movement between the housing 30 and the rod 28 in a first direction whereby the seat back frame 16 may be manually pivoted toward the upright position without actuating the motor 26 of the drive means. That is to say, when a predetermined force is applied to the seat back frame 16 to urge the seat back frame 16 toward an upright position, the rod 28 is urged into the housing 30 to move the element 42 relative to the element 40 (to the position illustrated in FIGURE 3) so that the element 42 is free to rotate about and along the rod 28 and relative to the element 40 to allow the rod 28 to move into the housing 30, thus allowing the seat back frame 16 to pivot toward the upright position. Once the force applied to the seat back frame 16 is removed, the spring 64 acts through the bearing 66 and against the element 42 to re-establish frictional driving engagement between the surfaces 56 and 58 of the elements 42 and 40 whereby the seat back frame is retained in the desired position and may be pivoted by actuation of the motor 26.

Thus, the instant invention sets forth a reclining seat assembly utilizing a power actuated means operatively interconnecting the seat frame with the seat back frame for pivoting the seat back frame relative to the seat frame in either direction upon actuation thereof and allows the seat frame to be manually pivoted toward the upright position independently of actuation thereof.

It will be understood, however, that the instant invention may also be utilized to great advantage in a seat assembly wherein the positioning mechanism is manually actuated as by employing a means to selectively allow the element 40 to rotate, thus allowing the seat back to pivot when a force is applied thereto.

The invention has been described in an illustrative manner and it is to be understood that the terminology which has been used is intended to be in the nature of words of description rather than of limitation.

Obviously, many modifications and variations of this invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A reclining seat assembly comprising: a seat frame, a seat back frame, means pivotally connecting said seat back frame to said seat frame for allowing said seat back frame to pivot relative to said frame between an upright position and various reclined positions, and power actuated means operatively interconnecting said seat frame and said seat back frame for pivoting said seat back frame relative to said seat frame in either direction upon actuation thereof and for allowing said seat back frame to be pivoted toward said upright position independently of actuation thereof, said power actuated means including first and second members adapted for movement relative to one another, drive means, a first element in positive driven engagement with said drive means and rotatably supported by said first member, and a second element threadedly engaging said second member and normally in driven frictional engagement with said first element for rotation thereby and movable out of said frictional engagement for rotation independently of said first element whereby said seat back frame may be pivoted from a reclined position toward the upright position as said drive means remains stationary.

2. A reclining seat assembly comprising: a seat frame, a seat back frame, means pivotally connecting said seat back frame to said seat frame for allowing said seat back frame to pivot relative to said seat frame between an upright position and various reclined positions, positioning means for controlling the pivotal movement of said seat back frame and including first and second members adapted for movement relative to one another, one of said members being pivotally connected to said seat back frame and the other member being operatively and pivotally connected to said seat frame, drive means, and control means for selectively moving said members relative to one another in first and second opposite directions upon rotation thereof by said drive means, said control means including a first portion rotatably supported by said second member and in positive driven engagement with said drive means and a second portion threadedly engaging said first member for rotation relative thereto, and means for allowing relative movement between said portions to allow relative movement between said members in said first direction as said drive means remains stationary whereby said drive means may be actuated to pivot said seat back frame in either direction and said seat back frame may be moved toward the upright position without actuating said drive means.

3. A reclining seat assembly comprising: a seat frame, a seat back frame, means pivotally connecting said seat back frame to said seat frame for allowing said seat back frame to pivot relative to said seat frame between an upright position and various reclined positions, positioning means for controlling the pivotal movement of said seat back frame and including first and second members adapted for movement relative to one another, one of said members being pivotally connected to said seat back frame and the other member being operatively and pivotally connected to said seat frame, drive means, and control means including a first element rotatably supported by said second member and in positive driven engagement with said drive means and a second element threadedly engaging said first member and normally in frictional driving engagement with said first element for rotation thereby and movable from said frictional driving engagement for rotation independently of said first element to allow relative movement between said members in said first direction, whereby said seat back frame may be manually pivoted toward said upright position without actuating said drive means.

4. A seat assembly as set forth in claim 3 wherein said second element includes a male conical surface for frictional driving engagement with a female conical surface in said first element.

5. A seat assembly as set forth in claim 3 wherein said first member comprises a threaded rod, a retaining means disposed on a first end of said rod, and biasing means disposed between said retaining means and said second element for urging said second element into said frictional driving engagement with said first element.

6. A seat assembly as set forth in claim 5 wherein said second member comprises a housing, said first end of said rod being disposed in said housing with said rod extending out of said housing to a second end thereof.

7. A seat assembly as set forth in claim 6 wherein said first element includes gear teeth disposed circumferentially thereabout and said drive means includes a worm gear rotatably supported by said housing and engaging said gear teeth for rotating said first element.

8. A seat assembly as set forth in claim 7 including first bearing means disposed between said biasing means and said second element and second bearing means rotatably supporting said first element in said housing for preventing relative movement between said first element and said housing in a direction parallel to the longitudinal axis of said rod.

9. A seat assembly as set forth in claim 8 wherein said second element includes a male conical surface for frictional driving engagement with a femal conical surface in said first element.

10. A seat assembly as set forth in claim 9 including a selectively actuatable motor means operatively connected to said worm gear for rotating said worm gear in either direction to rotate said first element in either direction to selectively position said seat back frame relative to said seat frame.

11. A seat assembly as set forth in claim 10 wherein said housing is pivotally connected to said seat back frame and said second end of said rod is operatively and pivotally connected to said seat frame.

12. A positioning mechanism adapted for interconnecting two relatively pivotal structures for controlling the relative pivotal movement therebetween and comprising: first and second members adapted for movement relative to one another, drive means, and control means for selectively moving said members relative to one another in first and second opposite directions upon rotation thereof by said drive means, said control means including a first portion rotatably supported by said second member and in positive driven engagement with said drive means and a second portion threadedly engaging said first member, and means for allowing relative movement between said portions to allow relative movement between said members in said first direction as said drive means remains stationary whereby said drive means may be actuated to rotate said elements for moving said members relative to one another in either of said directions and said members may be moved relative to one another in said first direction independently of said drive means.

13. A positioning mechanism adapted for interconnecting two relatively pivotal structures for controlling the relative pivotal movement therebetween and comprising: first and second members adapted for movement relative to one another, drive means, and control means including a first element rotatably supported by said second member and in positive driven engagement with said drive means and a second element threadedly engaging said first member and normally in frictional driving engagement with said first element for rotation thereby and movable from said frictional driving engagement for rotation independently of said first element to allow relative movement between said members in said first direction.

14. A mechanism as set forth in claim 13 wherein said second element includes a male conical surface for frictional driving engagement with a female conical surface in said first element.

15. A mechanism as set forth in claim 13 wherein said first member comprises a threaded rod, a retaining means disposed on a first end of said rod, and biasing means disposed between said retaining means and said second element for urging said second element into said frictional driving engagement with said first element.

16. A mechanism as set forth in claim 15 wherein said second member comprises a housing, said first end of said rod being disposed in said housing with said rod extending out of said housing to a second end thereof.

17. A mechanism as set forth in claim 16 wherein said first element includes gear teeth disposed circumferentially thereabout and said drive means includes a worm gear rotatably supported by said housing and engaging said gear teeth for rotating said first element.

18. A mechanism as set forth in claim 17 including first bearing means disposed between said biasing means and said second element and second bearing means rotatably supporting said first element in said housing for preventing relative movement between said first element and said housing in a direction parallel to the longitudinal axis of said rod.

19. A mechanism as set forth in claim 18 wherein said second element includes a male conical surface for frictional driving engagement with a femal conical surface in said first element.

20. A positioning mechanism adapted for interconnecting two relatively movable structures for controlling the relative movement therebetween and comprising: first and second members adapted for movement relative to one another, a first element rotatably supported by said second member, a second element threadedly engaging said first member for rotation relative thereto and normally in frictional engagement with said first element for rotation therewith and movable from said frictional engagement for rotation independently of said first element to allow relative movement between said members in a first direction, and means controlling rotation of said first element.

21. A mechanism as set forth in claim 20 in combination with a seat assembly including a seat frame, a seat back frame, means pivotally connecting said seat back frame to said seat frame for allowing said seat back frame to pivot relative to said seat frame between an upright position and various reclined positions, said first member being pivotally connected to one of said seat frame and said seat back frame and said second member being pivotally connected to the other of said seat frame and said seat back frame for controlling the pivotal movement of said seat back frame relative to said seat frame.

22. A mechanism as set forth in claim 20 wherein said second element includes a male conical surface in said frictional engagement with a female conical surface in said first element.

23. A mechanism as set forth in claim 22 wherein said first member comprises a threaded rod, a retaining means disposed on a first end of said rod, and biasing means disposed between said retaining means and said second element for urging said second element into said frictional engagement with said first element.

References Cited

UNITED STATES PATENTS

| | | | |
|---|---|---|---|
| 2,579,305 | 12/1951 | Gushman | 297—361 |
| 2,596,760 | 5/1952 | Bryant | 297—361 |
| 2,783,826 | 3/1957 | Haltenberger | 297—361 |
| 3,046,055 | 7/1962 | Martens | 297—361 |
| 3,062,584 | 11/1962 | Galla | 297—378 |
| 3,104,130 | 9/1963 | Martens | 297—355 |
| 3,127,788 | 4/1964 | Martens | 297—374 XR |

DAVID J. WILLIAMOWSKY, *Primary Examiner.*

CASMIR A. NUNBERG, *Examiner.*

G. O. FINCH, *Assistant Examiner.*